United States Patent Office 3,115,418
Patented Dec. 24, 1963

3,115,418
PROCESS OF PRODUCING GRAFT POLYMERS AND RESULTANT GRAFT POLYMER
Michel Magat, Adolphe Chapiro, and Jeanne Sebban, Paris, France, assignors to Centre National de la Recherche Scientifique, Ministere de l'Education Nationale, Republique Francaise, Paris, France
No Drawing. Filed Dec. 14, 1955, Ser. No. 553,156
Claims priority, application France Apr. 29, 1955
30 Claims. (Cl. 117—47)

This invention relates to new and useful improvements in grafting polymers or copolymers.

A graft polymer is one having a "backbone" or "trunk" of a polymer having a number of side chains or "branches" of a polymer. Thus, a graft polymer comprising, for instance, the trunk polymer $A_m$ with the grafted-on branches of polymer $B_n$ may be schematically illustrated as follows:

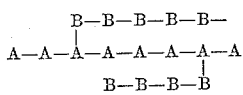

These graft copolymers generally possess properties which are appreciably different from those of ordinary copolymers constituted by components A and B distributed at random in a straight or branched chain as, for instance, exemplified by:

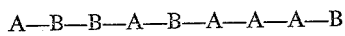

Ordinarily copolymers typified by the last illustration have properties intermediate between those of the two homopolymers $A_p$ and $B_q$ while the graft copolymers can possess both some properties of $A_p$ and some of $B_q$. In this respect, graft copolymers represent a class of compounds having properties different from those usual to ordinary plastic materials.

One object of the invention comprises a novel and improved method of obtaining graft polymers.

A further object is to effect the grafting on finished or semi-finished shaped products.

Another object of the invention comprises the obtaining of an activated (for grafting) polymer retaining a reasonable period of activation and storage or shelf life to remain capable of monomer grafting for some time.

The foregoing and still further objects of the invention will be apparent from the following description:

In accordance with the invention a polymer is subjected to ionizing radiation in the presence of oxygen or air, and the so treated polymer is contacted with a grafting material.

Ionizing radiation, as this term is well understood in the art, concerns the exposure of a material and especially of a high polymer to β-rays, γ-rays, neutrons, accelerated electrons and heavy particles, X-rays, etc. Convenient sources for such radiation may be furnished by atomic piles, electron or particle accelerators, radioactive isotopes, and X-ray equipment.

A suitable trunk polymer, in accordance with the invention, is any polymer capable of producing under ionizing radiation so-called "active centers," i.e. points of activation or reactivity at which grafting will take place. Suitable trunk polymers are thus, for instance, polyethylene, polyvinyl chloride, polyamide, polyglycolterephthalate, polystyrene, rubber, cellulose acetate, polymethylmethacrylate cellulose, and many others, as well as their copolymers and graft polymers.

The organic grafting material, useful, in accordance with the invention, may be any suitable monomer capable of being polymerized by free radicals as produced by conventional initiators. In one embodiment of the invention, the grafting material may be the same monomer as the one contained in the trunk polymer. In another and preferred embodiment of the invention, however, the grafting material is any other monomer polymerizable in the presence of free radicals as produced by polymerization initiators, as is well understood in the art of high polymers. Suitable polymerizable materials in accordance with the invention are thus, for example, the lower olefins and notably, ethylene, further polymerizable polyenes, especially polyolefins, vinyl compounds such as vinyl chloride, and vinylcarbazole, dienes, of, for instance, the type of butadiene, acrylic derivatives such as acrylonitrile, acrylamide, and many others.

Such monomers are well known and defined in the art by their characteristic polymerizability under the influence of initiators producing free radicals.

The type of ionizing radiation and the total dose to be used depend, in each case, upon several factors including the properties which the resulting graft polymer is intended to possess and whether or not for a given polymer mass, the grafting is desired only as a surface treatment or is to extend to substantial depth into the mass. If surface grafting only of a given mass of polymer material is desired, radiation of relatively low penetration is suitable such as that with the relatively less penetrating β-rays, accelerated particles or the lesser penetrating portion of the X-rays spectrum. On the other hand, if greater depth penetration is desired for the irradiation of the trunk polymer, exposure to γ radiation, high energy electrons, hard X-rays, or to neutrons is preferrerd.

The ultimate properties for a graft copolymer involving a given trunk polymer and graft material depend upon the relative closeness of the active centers produced by ionizing radiation along the chain of the trunk polymer. This, in turn, depends upon the amount of ionizing radiation to which the trunk polymer is subjected. The higher the amount of irradiation is, the closer will be the active centers along the trunk polymer chain and consequently the more frequent will be the branching for the graft polymer along that chain.

The number of active centers along the polymer chain also depend on the chemical structure of the polymer, the oxygen pressure during irradiation and to some extent on the intensity of the radiation beam. An increase in oxygen pressure over the ordinary partial pressure of oxygen in air will increase the number of active centers produced for a given dose and this effect is more pronounced at high intensities.

It is thus necessary that in each case the amount of radiation from a given radiation source be empirically determined which will accomplish a particular result sought for a specific trunk polymer and graft material combination. This determination is made in the conventional manner and the amount of radiation is defined, as is well known and understod, in terms of Roentgen units or R.E.P. units.

In the grafting step, in accordance with the invention, the trunk polymer may be present as powder, in granular form. Particularly advantageous and exceptional results are obtained with the trunk polymer in shaped form such as may be constituted by semi-finished or finished objects composed of this polymer or coated therewith. Such shaped bodies may include films, sheets, or the like, as well as solid or hollow bodies including rods, bars, tubes, vessels, fibers, etc.

The grafting step itself is carried out by contacting the irradiated trunk polymer with the graft material. This contacting may be effected with the grafting material present as such, or in the form of a suitable solution. Use of the grafting material as such is particularly applicable in those cases where the same is itself present under the conditions of reaction (especially as to temperature)

in substantially liquid form. Thus, for example, styrene is a liquid at ordinary temperature and may be contacted as such with the irradiated trunk polymer. If a solution of the graft material is to be used the solvent should be substantially inert to the action of free radicals. Suitable solvents of this type are, for instance, hexane, benzene, toluene, ethylacetate, ether, dioxane and similar materials. Inasmuch, however, as water is a good solvent for some monomers, we find it of advantage, within the preferred embodiment of the invention, to use in certain cases aqueous solutions of monomers.

Treatment of shaped materials in accordance with the invention permits the complete retention of their geometric configuration and is especially adapted to surface grafting allowing use to be made of desirable shaping or other characteristics of the base material and without interfering with its shape, acquire surface characteristics beneficial for a given purpose and lacking in the base material. Though the geometric shape of preshaped materials treated in accordance with the invention is not altered, the same may expand. This expansion can be appreciable such as, for instance, up to 30 times the original size, and can be taken advantage of for a variety of purposes.

The number of grafted branches and the extent of the length of grafted-on branch chains, and the extent of surface penetration of the grafting depend upon the operational conditions used in either the ionizing radiation treatment or the grafting reaction as such. The grafting step may thus be facilitated by carrying out the contacting of the grafting material with the irradiated polymer at raised temperatures and preferably between 40 and 180° C. and for best results, in the absence of oxygen. If the trunk polymer is crystalline or partly crystalline in nature, such as certain polyolefins, a temperature close to the softening or fusion point of the crystallites will facilitate penetration of the grafting material into greater depth of the trunk polymer mass. In some cases, if the trunk polymer has been subjected, on the other hand, to a fairly high amount of radiation, the grafting may be readily effected at ordinary temperatures. If the grafting material is a monomer used in appropriate solution of an inert solvent, the concentration of the monomer in its solution will determine the length of the grafted branches, higher concentrations favoring longer branches. Further, with respect to such monomer solutions, the use of a transfer agent makes it possible to produce a material with graft branches of desired length. Such chain transfer agents are well known in the art and typical examples thereof are, for instance, mercaptans and halogenated derivatives of organic compounds, and especially halogenated hydrocarbons as for example, carbontetrachloride, bromoform and the like.

The polymer materials subjected to ionizing radiation in accordance with the invention, have a surprising storage or shelf life, as they retain their capacity for grafting for periods well in excess of one month, when stored at room temperature.

It is thus seen that through the wide variations of the ionizing radiation to which a given trunk polymer is to be subjected, as well as though the wide variations possible for the grafting reaction usually including polymerization per se, a wide variety of different results by way of properties of the grated products may be obtained even from the same combination of trunk polymer and grafting material.

As stated, one of the foremost advantages of the graft polymerization of shaped polymers which are either semi-finished or finished, is that their characteristics and particularly their surface characteristics, may be modified. In this manner, the surface of a given polymer article may be modified to become substantially hydrophilic so as to permit the application thereto of coloring matter, or yield surfaces which can be readily printed or written upon. Alternatively, the surface of a given polymer may be rendered more wear resistant or it may be rendered more resistant to oils, acids, alkalis, hydrocarbons, etc. Specific examples are thus, for instance, finished or semi-finished articles composed of a polymer which has excellent shaping or molding characteristics and can be, for instance, readily extruded and yet possesses surface characteristics which for a given industrial purpose render its use, for example because of corrosion, by acids, alkalis, hydrocarbons, etc., unsuitable. It is then possible to graft onto the surface of such a shaped polymer, a copolymer which possesses or imparts the desired characteristics of corrosion resistance, but which, as a polymer per se, could not have been used because of a lack of moldability or extrudability required for the shaping of the object.

The invention is particularly applicable to the grafting treatment of relatively thin shapes or objects, i.e. those of a thickness less than 1 to 2 mm. In that case, relatively weak X-rays (tension below 50 kv.) may be used which makes it possible to obtain very high radiation intensities with relatively inexpensive arrangements or equipment.

It is preferable, as previously stated, to carry out the grafting step in the absence of air, because as is known, oxygen acts as a polymerization inhibitor.

Generally, the polymerization reaction is favored by increased temperatures which, depending upon the particular polymer and monomer used, may range between about 40 and 180° C. The grafting temperature, however, affects also the length of the grafted branches. The rise in the temperature can increase or reduce this length according to whether the propagation reaction or chain transfer reaction and initiation reaction, is predominant. This is a phenomenon well established in high polymer chemistry.

As above pointed out, the amount of radiation necessary for the grafting reaction depends on the system used and on the qualities desired for the grafted material. In order to determine in each case the optimum dose, it is but necessary to carry out a few simple standard experiments with polymers having received increasing amounts of radiation. The total doses to be used depend on the polymer, the monomer and the result to be obtained. In some cases, doses of 10,000 to 100,000 roentgens are sufficient; in other extreme cases doses as high as 10–50 megaroentgens will be required.

When then conducting the grafting reaction in the presence of a chain transfer agent, it is possible to adjust the length of a grafted branch within relatively narrow limits.

One of the most remarkable results achieved by the invention is the possibility of the combining by grafting of intrinsically different types or classes of polymers. Polyacrylonitrile on polyamides, polyacrylamide on cellulose acetate are typical examples.

The invention lends itself particularly well to the grafting of polyethylene and, by carefully selecting the monomer to be grafted, the copolymer of the polyethylene can be given good compatibility with coloring matters or printing inks. It is thus even possible to obtain hydrophilic plastic materials having a hydrocarbon base, or in some cases, to otherwise modify the structure of the polyethylene and particularly to reduce its porosity.

In the following examples, which are furnished by way of illustration and not of limitation, radiation was effected with $\gamma$-rays and the dosimetry used corresponds to an oxidation of 15.5 molecules of $FeSO_4$ per 100 ev. absorbed.

*Example 1*

A small sheet of polyvinyl chloride, which has been previously irradiated in the presence of air with $\gamma$-rays, with a dose of 2.3 megaroentgens and measuring 57 x 5 mm.² while weighing 0.1423 g., has been sealed under vacuum, after degassing, in an ampoule containing 5 cm.³ acrylonitrile. The ampoule was then heated for 20 tours at 100–110° C. At the beginning of the heating, the sample showed a lighter color than initially. At the end of the heating, it had considerably darkened. The treated sample measured 70 x 5 mm.² and weighed 0.1841 g., i.e. had increased in weight by 0.0148 g. Very small amounts of polyacrylonitrile in the form of powder were obtained in this experiment.

*Example 2*

A small sheet of the same polyvinyl chloride irradiated as in Example 1 and measuring 45 x 4 mm.² which weighing 0.0925 g., was sealed under vacuum in an ampoule containing 5 cm.³ pure acrylonitrile. The ampoule was heated for five hours at 130–140° C. and for 20 hours at 100–110° C. At the beginning of the heating, the color of the sample was lighter than the initial color. On the other hand, at the end of the heating, the sample had darkened considerably. The final sample measured 59 x 4 mm.² and weighed 0.1396 g. The amounts of pure polyacrylonitrile formed were very small.

*Example 3*

A film of polystyrene, previously irradiated in the presence of air with $\gamma$-rays with a dose of 13.5 megaroentgens and weighing 0.0811 g., was sealed under vacuum in an ampoule containing 5 cm.³ of an aqeous solution of acrylamide at 20% by weight. The ampoule was heated durring 2½ hours at 130–140° C. Right at the beginning of the heating, the film of polystyrene contracted up to about ⅕ of its initial surface and became whitish; at the same time the solution of acrylamide became very viscous. The final sample weighed 0.1238 g., swelled on the surface in boiling water and appeared as a very hard corneous mass.

*Example 4*

A film of polystyrene, previously irradiated with $\gamma$-rays with a dose of 13.5 megaroentgens and weighing 0.077 g., was placed into an ampoule containing 5 cm.³ of 15% by weight aqueous solution of acrylonitrile. The ampoule was sealed under vacuum after degassing. It was heated for 24 hours at 100–110° C. and 24 hours at 150° C. During the heating, the film curled up and tore in several places. Small amounts of polyacrylontrile were formed.

The final sample weighed 0.1055 and was cold treated with toluene. After several rinsings, a solid residue remained insoluble in toluene. This residue weighed 0.0584 g.

*Example 5*

A film of polyethylene previously subjected to the radiation of the Saclay atomic pile to a total flux of $9.9 \cdot 10^{17}$ neutrons/cm.² and measuring 108 x 28 mm.² while weighing 0.1542 g., was placed in an ampoule containing an aqueous 50% by weight solution of acrylamide. The ampoule was sealed under vacuum. After a few hours at ordinary temperature, the film, after swelling first, became whitish in places. The acrylamide solution had become viscous as a result of the formation of polyacrylamide. After 72 hours, the film in the ampoule formed a compact mass. The film taken out from the ampoule was then washed in boiling water and unfolded. After drying, the film weighed 1.9015 g. and measured 170 x 30 mm.². This film, upon being dipped in water, swelled on the surface and could be colored by ordinary ink.

*Example 6*

A thread of nylon previously irradiated in the atomic pile with a total flux of $4.2 \cdot 10^{18}$ neutrons/cm.², measuring 10 cm. in length and 1 mm. in diameter while weighing 0.097 g., was placed in a bulb containing 5 cm.³ acrylonitrile. The bulb was sealed under vacuum. It was then heated to 70° C. for 2½ hours. A precipitate of acrylonitrile appeared immediately, while nothing had been noticed at ordinary temperature. At 140° C. the reaction started again; it was continued for 3 hours at the same temperature. The thread which did not seem to swell in acrylonitrile had become lighter at the end of the treatment. It measured 10.5 cm. in length and weighed, after drying under vacuum, 0.105 g. In this experiment there were obtained 0.015 g. of polyacrylonitrile in the form of powder.

*Example 7*

A sheet of glycol polyterephthalate measuring 30 x 8 mm.² and weighing 0.2082 g. was subjected to the radiation of the atomic pile at a total flux of $4.2 \cdot 10^{18}$ neutrons/cm.². It was put into an ampoule containing 5 cm.³ acrylonitrile. The ampoule was sealed under vacuum. At ordinary temperature, the formation of polyacrylonitrile and an increase of the surface and thickness of the plate were noticed. After 18 hours, the ampoule was heated at 110° C. for 2 hours and at 130–140° C. for one hour. With each increase in temperature, the reaction started anew and the amount of polyacrylonitrile formed was larger at the highest temperature. At the end of the experiment, the plate weighed 0.29 g. and measured 34 x 9 mm.². It had become less flexible.

*Example 8*

A film of cellulose acetate weighing 0.138 g., measuring 45 x 12 mm.² and previously subjected to the radiation of the atomic pile at a total flux of $5.5 \cdot 10^{18}$ neutrons/cm.², was placed into an ampoule containing 5 cm.³ of an aqueous 47.5% by weight solution of acrylamide. The ampoule was sealed under vacuum. During the degassing, a significant liberation of gas took place with the formation of foam around the film which broke. A polymerization of acrylamide already took place before the ampoule was sealed. Under vacuum, the film became more and more opaque and swelled. After remaining for 16 hours at ordinary temperature (15–20° C.), the solution became extremely viscous. Dipped in water, it swelled considerably on its surface. The film pieces, the surface of which had considerably increased, were separated from the swollen mass of polyacrylamide and were dried. They weighed 0.962 g., i.e. 7 times more than the initial weight.

*Example 9*

A sheet of polymethylmethacrylate weighing 0.623 g. measuring 59 x 6.5 mm.² and previously subjected to the radiation of the pile at a total flux of $5.5 \cdot 10^{18}$ neutrons/cm.², was arranged in an ampoule containing 5 cc. of an aqueous 47.5% by weight solution of acrylamide. The ampoule was sealed under vacuum. The polymer sheet broke and gaseous bubbles escaped from the solid. In the cold no polymerization of acrylamide was noted. Heating at 100° C. for ¼ hour produced a spongy mass weighing 2.436 g., swelling on the surface only in water. After separation of polyacrylic amide and drying, this mass, still spongy but having become hard and brittle, weighed 1.366 g., i.e. twice the initial weight.

*Example 10*

1.014 g. of polyethylene in the form of grains ("grade No. 7") was subjected in the presence of air to a dose of $4.15 \cdot 10^6$ roentgens of $\gamma$-rays at the rate of 3.220 roentgens per hour. These irradiated grains were then introduced with 2 cm.³ acrylonitrile dissolved in 8 cm.³ decahydronaphthalene, into a glass ampoule which had been degassed and sealed under vacuum. The mixture was thereafter heated in an oven at 150–170° C. for two hours. The ampoule was then opened and the copolymer was dried. Its final weight was 2.12 g. In spite of the heating, the copolymer grains remained distinctly separated from one another but their volume had considerably increased. These grains swelled in dimethylformamide without, however, dissolving.

Example 11

A thin film of polyethylene was subjected in the presence of air to a dose of $16.2 \times 10^6$ roentgens at the rate of 10,200 roentgens per hour. A portion of this film measuring 31 x 80 mm.² and weighing 0.121 g. was introduced together with 3.85 g. acrylonitrile, into a glass ampoule which had been sealed under vacuum. The mixture was heated for one hour at 120–140° C., then for 17 hours at 100° C. Thereafter, 3.24 g. of a yellowish polymer in the form of a wrinkled film were removed from the ampoule. The copolymer thus obtained was heated for several hours at 110° C. in dimethylformamide and washed several times in this solvent. Evaporation of the washing solution produced 0.12 g. of polyacrylonitrile. The remaining copolymer mass was considerably extended with solvent, the whole weighing 24.7 g. This mass was spread to obtain a swollen film having a surface of 135 x 415 mm.². After air drying, half of this film, a hard brittle polymer sheet of 75 x 105 mm.² was obtained. Drying the other half of the film between two glass plates produced a thinner and rather flexible sheet having a surface of 100 x 135 mm.². The total dry weight of both of these dried sheets was 3.08 g.

Example 12

A 200 x 65 mm.² portion of a film of irradiated polyethylene similar to that of Example 11 and weighing 0.65 g., was introduced with 2.8 g. acrylonitrile into an ampoule which had been sealed under vacuum. The mixture was heated for one hour at 90–95° C. and then for 3½ hours at 110° C. There was thus obtained a film which swelled in dimethylformamide up to a final weight of 16 g. and a surface of 400 x 130 mm.². After air drying the film weight was 2.4 g. In this case, only traces of polyacrylonitrile were produced.

Example 13

A portion of about 220 x 70 mm.² of a film of irradiated polyethylene, similar to that of Example 11 and weighing 0.828 g., was introduced into an ampoule and sealed under vacuum, with 0.8 g. acrylonitrile. After heating for 7 hours at 85–90° C. there were obtained 1.11 g. of a copolymer swelling in dimethylformamide up to a final weight of 3 g. After drying, the film measured 250 x 80 mm.² and weighed 1.05 g. This film was very flexible, slightly yellowish and transparent.

Example 14

A 95 x 37 mm.² portion of a film of irradiated polyethylene similar to that of Example 11 and weighing 0.0886 g., was introduced into an ampoule and sealed under vacuum with 2.104 g. of degassed acrylamide. The mixture was heated for a few hours at 100° C., then at 150–160° C. There were thus obtained 1.268 g. of a white polymer mass which had become hydrophilic because it swelled in water up to a final weight of 12.08 g. and which could be spread out in the form of a film. The latter, upon being dried between two glass plates, strongly adhered to said plates and had become brittle. The hydrophilic characteristic or wettability of the material thus obtained was also demonstrated by the fact that this material could be colored and that it was possible to write on the film with ordinary ink.

Example 15

A film of irradiated polyethylene similar to that of Example 11 and measuring 95 x 38 mm.² and weighing 0.09 g. was introduced with 5 cm.³ of vinylidene chloride into an ampoule which was thereafter sealed under vacuum. The mixture was heated up to 190° C. and maintained at 110° C. for one hour, and at 90° C. for 17 hours. There was thus obtained a film of a very friable copolymerized material weighing 2.55 g. and swelling slightly in trichlorobenzene. This film was too fragile to be unfolded without tearing. When dry, the mass was hard and brittle.

It will be seen from the foregoing, that in each case the ionizing radiation of the polymer is determined (as its designation implies) for and is carried out at an intensity and for a period of time sufficient to produce active centers or groups therein, i.e. to convert the polymer into a polymerization initiator for monomers polymerizable by free radicals.

We claim:

1. Process for producing graft polymers which comprises subjecting an organic polymer to high energy ionizing radiation, in the presence of oxygen with an effective radiation dose to cause formation of active centers, and thereafter contacting the irradiated polymer with a monomer capable of being polymerized by free radicals to thereby graft polymerize said monomer onto said polymer.

2. Process for producing graft polymers which comprises subjecting an organic polymer to high energy ionizing radiation in the presence of a gaseous oxygen containing atmosphere with an effective radiation dose to cause formation of active centers and thereafter contacting the irradiated polymer with a monomer polymerizable by free organic radicals to thereby graft polymerized said monomer onto said polymer.

3. Process according to claim 2, in which said contacting is carried out in substantially the absence of externally admitted gaseous oxygen.

4. Process according to claim 2, in which said monomer is substantially dissolved in a solvent therefor substantially inert to the action of free polymer radicals.

5. Process according to claim 2, in which said contacting is carried out at a temperature substantially from 40 to 180° C.

6. Process according to claim 2, in which said contacting is carried out in the presence of a chain transfer agent.

7. Process according to claim 2, in which said monomer is substantially water soluble and in which said solvent is water.

8. Process according to claim 2, in which said contacting is carried out in substantially the absence of externally admitted gaseous oxygen, in which said monomer is substantially dissolved in a solvent therefor substantially inert to the action of free polymer radicals, and in which said contacting is carried out at a temperature substantially from 40 to 180° C.

9. Process according to claim 8, in which said contacting is carried out in the presence of a chain transfer agent.

10. Process according to claim 9, in which said monomer is substantially water soluble and in which said solvent is water.

11. Process for producing graft polymers which comprises subjecting a shaped organic polymer to high energy ionizing radiation in the presence of a gaseous oxygen containing atmosphere with an effective radiation dose to cause formation of active centers and thereafter contacting the irradiated polymer with the solution of a monomer, polymerizable by free organic radicals, in a solvent for said monomer substantially inert to the action of free polymer radicals.

12. Process according to claim 11, in which said ionizing radiation is substantially confined to the surface of said polymer.

13. Process according to claim 12, in which said contacting is carried out at a temperature substantially from 40 to 180° C. and in substantially the absence of externally admitted gaseous oxygen.

14. Process according to claim 13, in which said contacting is carried out in the presence of a chain transfer agent.

15. Process according to claim 14, in which said monomer is substantially water soluble and in which said solvent is water.

16. Process for producing graft polymers which comprises subjecting a polyethylene to high energy ionizing radiation in the presence of oxygen with an effective radiation dose to cause formation of active centers, and thereafter contacting the irradiated polyethylene with a monomer polymerizable by free radicals to thereby graft polymerize said monomer onto polymer.

17. Improvement according to claim 16 in which said contacting is carried out in substantially the absence of externally admitted gaseous oxygen, in which said monomer is substantially dissolved in a solvent therefor substantially inert to the action of free polymer radicals, and in which said contacting is carried out at a temperature substantially from 40 to 180° C.

18. Process for producing graft polymers which comprises subjecting a shaped polyethylene to high energy ionizing radiation in the presence of a gaseous oxygen containing atmosphere with an effective radiation dose to cause a formation of active centers and thereafter contacting the irradiated polyethylene with the solution of a monomer, polymerizable by free organic radicals, in a solvent for said monomer substantially inert to the action of free polymer radicals to thereby graft polymerize said monomer onto said polyethylene, said ionizing radiation being substantially confined to the surface of said polyethylene.

19. Process according to claim 18, in which said contacting is carried out at a temperature substantially from 40 to 180° C. and in substantially the absence of externally admitted gaseous oxygen, and in which said contacting is carried out in the presence of a chain transfer agent.

20. In the process for producing graft polymers, the improvement comprising contacting a shaped polyethylene previously irradiated in the presence of oxygen with high energy ionizing radiation of effective dosage to cause the formation of active centers with a monomer polymerizable by free radicals to thereby graft polymerize said monomer onto said polyethylene.

21. The improvement according to claim 20 in which only the surface of said polyethylene has been previously irradiated, and in which said contacting is carried out at a temperature substantially from 40 to 180° C.

22. The improvement according to claim 21, in which said contacting is carried out at a temperature below substantially 80° C.

23. The improvement according to claim 20, in which only the surface of said polyethylene has been previously irradiated, and in which said contacting is carried out at a temperature substantially from 40 to 180° C., and in substantially the absence of externally admitted gaseous oxygen.

24. Improvement according to claim 23, in which said contacting is carried out in the presence of a chain transfer agent.

25. The improvement according to claim 24, in which said monomer is substantially water soluble and in which said solvent is water.

26. In the process for producing graft polymers the improvement of which comprises contacting an organic polymer previously irradiated in the presence of oxygen with high energy ionizing radiation of an effective dosage to cause the formation of active centers, with a monomer polymerizable by free radicals to thereby graft polymerize said monomer onto said polymer.

27. In the process for producing graft polymers, the improvement comprising contacting an organic polymer previously irradiated in the presence of air with high energy ionizing radiation of effective dosage to cause the formation of active centers with a monomer polymerizable by free radicals.

28. A shaped article comprising a shaped body composed on at least the surface thereof, of a graft copolymer composed of an organic trunk polymer previously irradiated, in the presence of air, with high energy ionizing radiation of effective dosage to cause the formation of active centers and branch chains of an organic polymer, the monomer of which is polymerizable by free radicals.

29. A shaped article in accordance with claim 28, in which said trunk polymer is polyethylene.

30. A grafted polymer product comprising an organic trunk polymer previously irradiated in the presence of air with high energy ionizing radiation of effective dosage to cause the formation of active centers and branch chains of an organic polymer the monomer of which is polymerizable by free radicals said trunk polymer being a member selected from the group consisting of polyvinyl chloride, polystyrene, polyethylene, polyamide, polyterephthalate, cellulose acetate and polymethylmethacrylate, and said chain polymer being selected from the group consisting of polyacrylonitrile, polyvinylidene chloride and polyacrylamide.

References Cited in the file of this patent

UNITED STATES PATENTS

| 2,566,251 | Richards | Aug. 28, 1951 |
| 2,666,025 | Nozaki | Jan. 12, 1954 |

OTHER REFERENCES

Wall: Effects of Radiation on Dielectric Materials, pages 147–148, Nov. 1, 1955.

Journal of American Chemical Society vol. 77 (Feb. 20, 1955), pp. 847 and 849.

UNITED STATES PATENT OFFICE
CERTIFICATE OF CORRECTION

Patent No. 3,115,418                             December 24, 1963

Michel Magat et al.

It is hereby certified that error appears in the above numbered patent requiring correction and that the said Letters Patent should read as corrected below.

Column 3, line 61, for "though" read -- through --; line 64, for "grated" read -- grafted --; column 5, line 3, for "tours" read -- hours --; line 7, for "0.0148 g." read -- 0.0418 g. --; column 8, lines 24 and 25, for "polymerized" read -- polymerize --.

Signed and sealed this 2nd day of June 1964.

(SEAL)
Attest:

ERNEST W. SWIDER
Attesting Officer

EDWARD J. BRENNER
Commissioner of Patents